(12) United States Patent
Chue

(10) Patent No.: US 7,502,197 B1
(45) Date of Patent: Mar. 10, 2009

(54) DISK DRIVE DEMODULATING A TIME-BASED SERVO PATTERN

(75) Inventor: Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/703,000

(22) Filed: Feb. 6, 2007

(51) Int. Cl.
*G11B 5/596* (2006.01)
*G11B 5/09* (2006.01)

(52) U.S. Cl. ................................ 360/77.08; 360/48

(58) Field of Classification Search .................. None
See application file for complete search history.

(56) References Cited

U.S. PATENT DOCUMENTS

| | | | |
|---|---|---|---|
| 5,689,384 | A | 11/1997 | Albrecht et al. |
| 6,590,729 | B1 | 7/2003 | Akagi et al. |
| 6,754,016 | B2 | 6/2004 | Messner et al. |
| 6,781,778 | B1 | 8/2004 | Molstad et al. |
| 6,961,203 | B1 * | 11/2005 | Baker ............... 360/77.08 |
| 6,967,808 | B1 | 11/2005 | Bandic et al. |
| 6,999,258 | B2 | 2/2006 | Molstad et al. |
| 7,009,802 | B1 | 3/2006 | Ehrlich |
| 7,054,092 | B2 | 5/2006 | Ehrlich |
| 2005/0180040 | A1 | 8/2005 | Dugas et al. |
| 2005/0259364 | A1 | 11/2005 | Yip |
| 2006/0044671 | A1 | 3/2006 | Weber et al. |

OTHER PUBLICATIONS

Eric C. Hughes, et al., "New Servo Pattern for Hard Disk Storage Using Pattern Media", Journal of Applied Physics, May 15, 2003, vol. 93, No. 10, pp. 7002-7004.
A. Patapoutian, "Signal Space Analysis of Head Positioning Formats", IEEE Transactions on Magnetics, May 1997, vol. 33, No. 3, pp. 2412-2418.
T. Hamaguchi, et al., "An Accurate Head-Positioning Signal for Perpendicular Recording Using a DC-Free Servo Pattern", Journal of Applied Physics, May 15, 2002, vol. 91, No. 10, pp. 8697-8699.
A. Sacks, "Position Error Signal Generation in Magnetic Disk Drives", PhD Thesis, Carnegie-Mellon University, 1995, 37 pages.

* cited by examiner

*Primary Examiner*—Andrew L Sniezek
(74) *Attorney, Agent, or Firm*—Howard H. Sheerin, Esq.

(57) ABSTRACT

A disk drive is disclosed including a disk having a first and second set of time-based servo patterns. The first set of time-based servo patterns comprises a first cyclical pattern that repeats radially over the disk, and the second set of time-based servo patterns comprises a second cyclical pattern that repeats radially over the disk, wherein each cyclical pattern comprises a plurality of timing marks. One of the first cyclical patterns overlaps at least part of a first servo track, and one of the second cyclical patterns overlaps at least part of the first servo track. At least one of the first and second set of time-based servo patterns are demodulated by detecting first and second time intervals relative to the timing marks, and a control signal for actuating the head is generated in response to the first and second time intervals.

18 Claims, 9 Drawing Sheets

DISK DRIVE DEMODULATING A TIME-BASED SERVO PATTERN

BACKGROUND

1. Field

The present invention relates to disk drives for computer systems. More particularly, the present invention relates to a disk drive demodulating a time-based servo pattern.

2. Description of the Related Art

A disk drive comprises a head attached to a distal end of an actuator arm which is rotated about a pivot to actuate the head radially over a disk. The disk typically comprises embedded servo sectors including head positioning information used to seek the head to a target track and maintain the head over the track during write/read operations. FIG. 1A shows a prior art format of a disk 2 comprising a plurality of embedded servo sectors $4_0$-$4_N$ that define a plurality of radially spaced, concentric servo tracks 6. Each servo sector $4_i$ comprises a preamble 8 for synchronizing timing recovery to the data rate, and a sync mark 10 for symbol synchronizing to a servo data field 12, where the servo data field 12 typically comprises a servo track address that identifies the servo track and provides coarse head position information during seeking. Each servo sector $4_i$ further comprises fine head positioning information used to maintain the head over a data track during a tracking operation. In the example of FIG. 1A, the fine head position information comprises a plurality of servo bursts 14 positioned at precise offsets and intervals with respect to the centerline of the servo track. Each servo burst 14 comprises a burst of high frequency magnetic transitions which are typically demodulated by integrating the rectified read signal as the head passes over each burst. The demodulated bursts are then processed mathematically (e.g., compared) to generate a position error signal representing the position error of the head with respect to the servo track.

FIG. 1B illustrates an alternative prior art "time-based" method for generating the position error signal used for centerline tracking. Each servo sector $4_i$ comprises a time-based servo pattern including a plurality of timing marks formed from one or more magnetic transitions (e.g., a plurality of short sync marks). A plurality of time intervals are detected between the timing marks and the position error signal generated in response to the detected time intervals. In the example shown in FIG. 1B, the timing marks form an "open N" shape, wherein the time intervals T1 and T2 change relative to the radial position of the head. To avoid interference between adjacent servo patterns (in the radial direction), the servo patterns are separated circumferentially, as illustrated in FIG. 1B, and processed in an interleaved manner. However, when using the time-based servo pattern shown in FIG. 1B, there is signal loss when the head 16 is positioned between the tracks of adjacent servo patterns. For example, when the head 16 is positioned between track N and track N+1, there is signal loss since the head 16 extends beyond the servo pattern (beyond the bottom of the servo pattern $15_i$ of servo sector $4_i$ and beyond the top of the servo pattern $17_i$ of servo sector $4_{i+1}$).

There is, therefore, a need for an improved time-based servo pattern format for use in a disk drive.

SUMMARY OF THE INVENTION

An embodiment of the present invention comprises a disk drive including a disk comprising a first set of time-based servo patterns and a second set of time-based servo patterns that define a plurality of servo tracks. The first set of time-based servo patterns comprises a first cyclical pattern that repeats radially over the disk, and the second set of time-based servo patterns comprises a second cyclical pattern that repeats radially over the disk, wherein each cyclical pattern comprises a plurality of timing marks. One of the first cyclical patterns overlaps at least part of a first servo track, and one of the second cyclical patterns overlaps at least part of the first servo track. A head is positioned over the disk by demodulating at least one of the first and second set of time-based servo patterns. A first and second time intervals are detected relative to the timing marks, and a control signal for actuating the head is generated in response to the first and second time intervals.

In one embodiment, the first cyclical pattern is the same as the second cyclical pattern, and in an alternative embodiment, the first cyclical pattern is different from the second cyclical pattern.

In another embodiment, the first cyclical pattern overlaps the entire first servo track, and the second cyclical pattern overlaps a portion of the first servo track.

In yet another embodiment, the first set of time-based servo patterns is processed to generate the control signal used to maintain the head over the first servo track, and in one embodiment the second set of time-based servo patterns is processed to generate the control signal used to maintain the head over a second servo track adjacent the first servo track.

In still another embodiment, the first set of time-based servo patterns comprises a first timing mark, and the second set of time-based servo patterns comprises a second timing mark, wherein the first timing mark comprises a first timing mark pattern, and the second timing mark comprises a second timing mark pattern different than the first timing mark pattern.

In another embodiment, the first and second set of time-based servo patterns overlap in the circumferential direction such that the first and second set of time-based servo patterns share at least one timing mark.

In yet another embodiment, at least one of the first and second set of time-based servo patterns comprises first and second timing marks, wherein the first timing mark comprises a first timing mark pattern, and the second timing mark comprises a second timing mark pattern different than the first timing mark pattern.

In another embodiment, the disk further comprises at least one groove between each servo track.

Another embodiment of the present invention comprises a method of operating a disk drive, the disk drive comprising a disk having a first set of time-based servo patterns and a second set of time-based servo patterns that define a plurality of servo tracks. The first set of time-based servo patterns comprises a first cyclical pattern that repeats radially over the disk, and the second set of time-based servo patterns comprises a second cyclical pattern that repeats radially over the disk, wherein each cyclical pattern comprises a plurality of timing marks. One of the first cyclical patterns overlaps at least part of a first servo track, and one of the second cyclical patterns overlaps at least part of the first servo track. A head is positioned over the disk by demodulating at least one of the first and second set of time-based servo patterns. A first and second time intervals are detected relative to the timing marks, and a control signal for actuating the head is generated in response to the first and second time intervals.

DETAILED DESCRIPTION OF EMBODIMENTS OF THE INVENTION

Figure 2B:
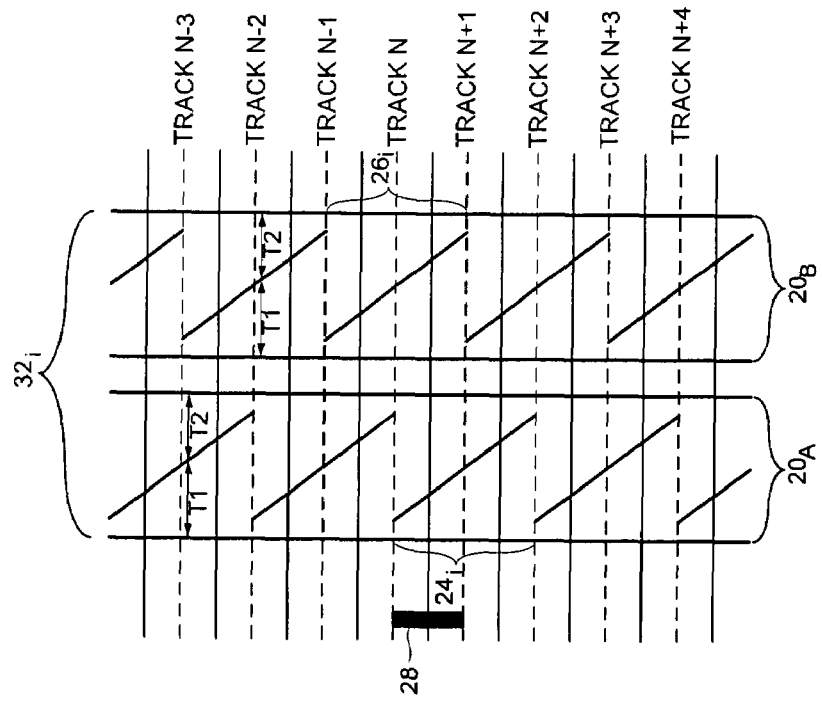
FIG. 2B shows an embodiment of the present invention wherein the new time-based servo pattern comprises first and second cyclical patterns that repeat radially over the disk, wherein one of the first cyclical patterns overlaps at least part of a first servo track, and one of the second cyclical patterns overlaps at least part of the first servo track.
Figure 2A:
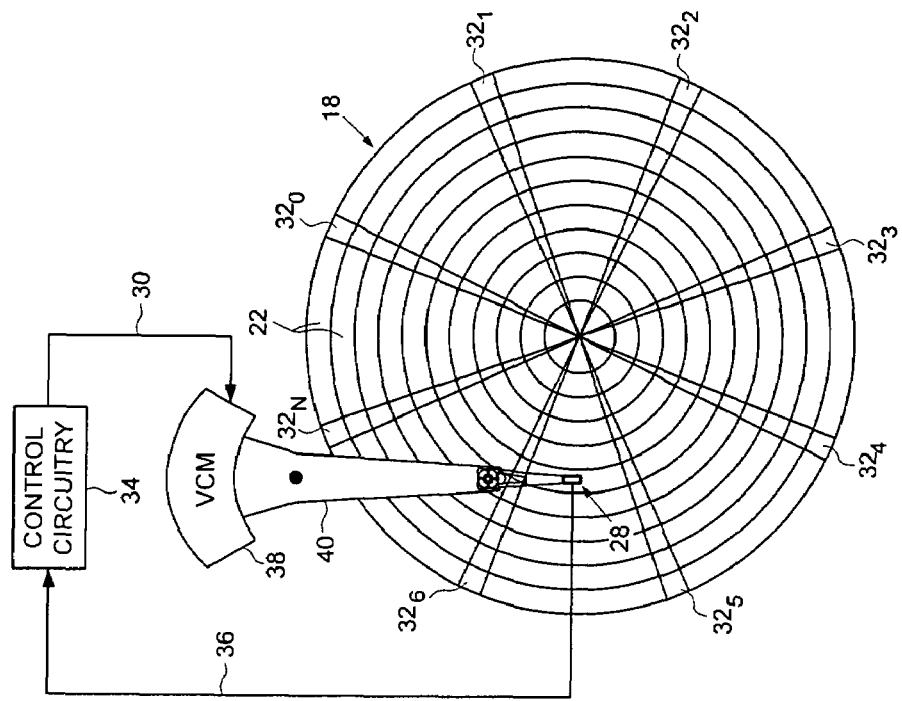
FIG. 2A shows a disk drive according to an embodiment of the present invention comprising control circuitry for demodulating a new time-based servo pattern to position a head over a disk.

FIGS. 2A and 2B show an embodiment of the present invention as a disk drive including a disk 18 comprising a first set of time-based servo patterns $20_A$ and a second set of time-based servo patterns $20_B$ that define a plurality of servo tracks 22. The first set of time-based servo patterns $20_A$ comprises a first cyclical pattern $24_i$ that repeats radially over the disk 18, and the second set of time-based servo patterns $20_B$ comprises a second cyclical pattern $26_i$ that repeats radially over the disk 18, wherein each cyclical pattern comprises a plurality of timing marks. One of the first cyclical patterns $24_i$ overlaps at least part of a first servo track (e.g., servo track N+1), and one of the second cyclical patterns $26_i$ overlaps at least part of the first servo track. A head 28 is positioned over the disk 18 by demodulating at least one of the first and second set of time-based servo patterns $20_A$ and $20_B$. A first and second time intervals (e.g., T1 and T2) are detected relative to the timing marks, and a control signal 30 for actuating the head 28 is generated in response to the first and second time intervals.

Figure 1A:
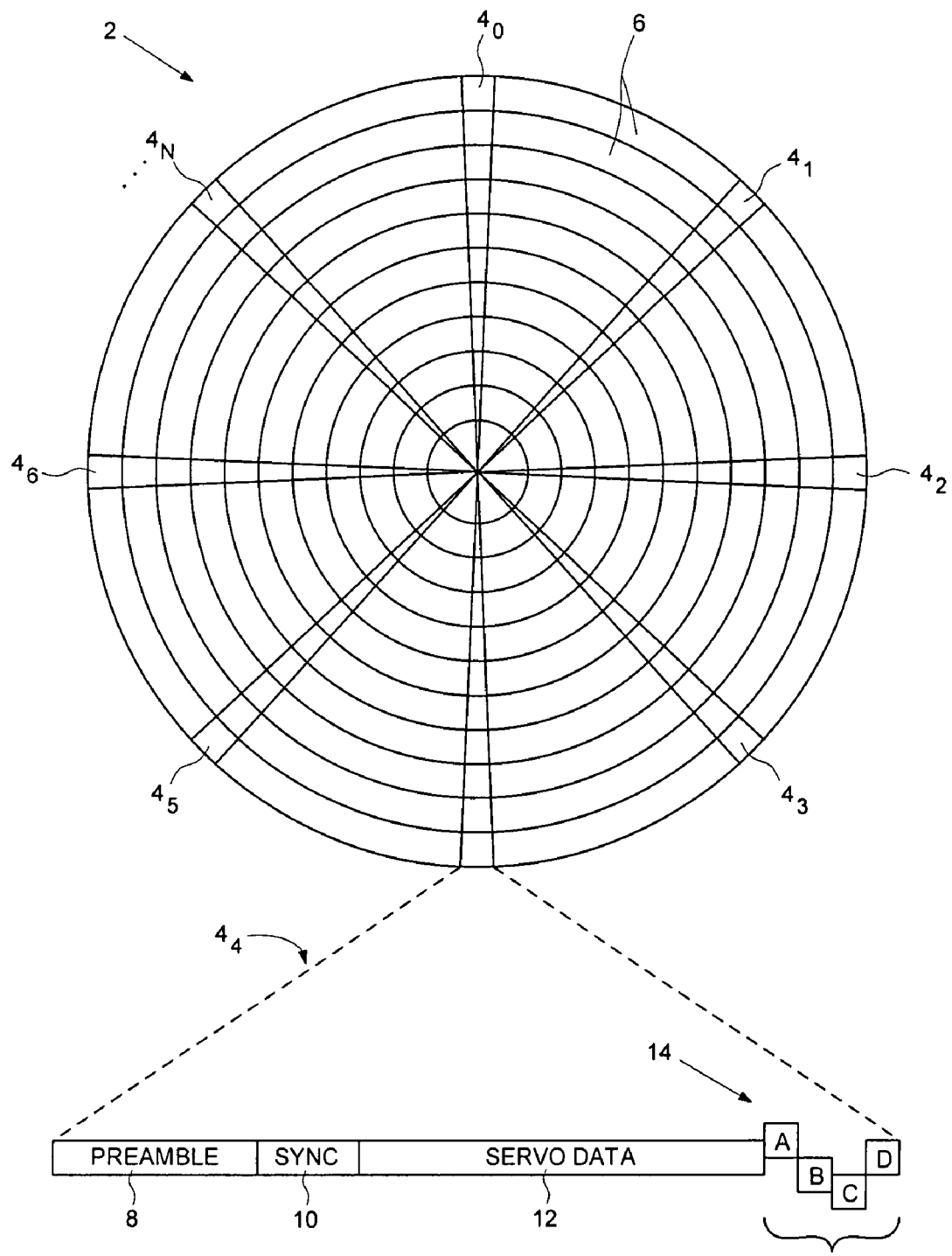
FIG. 1A shows a prior art disk format including a plurality of concentric servo tracks defined by a plurality of embedded servo sectors wherein each servo sector comprises a plurality of servo bursts that define a track centerline.
Figure 1B:
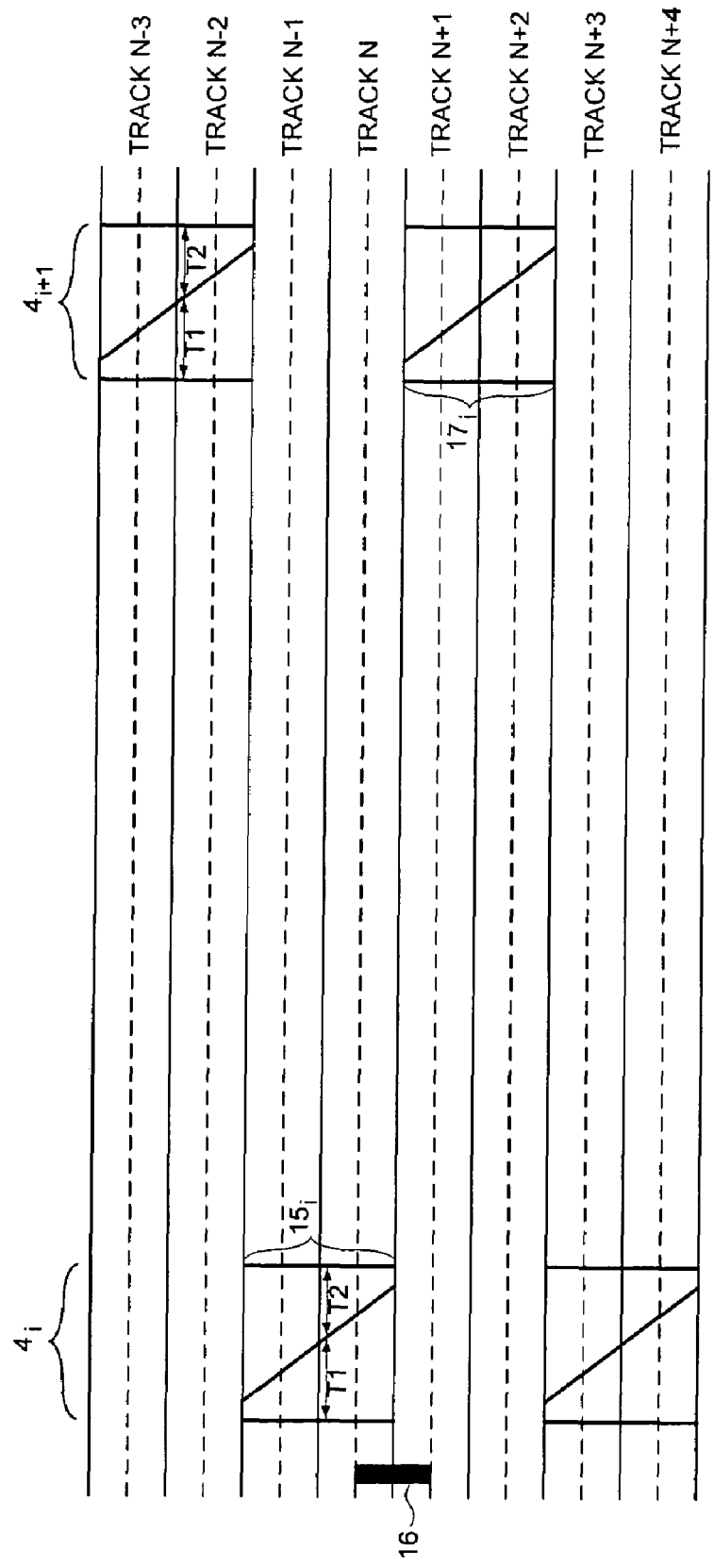
FIG. 1B shows a prior art disk format wherein the servo bursts of FIG. 1A are replaced by time-based servo patterns that define a track centerline.

In the embodiment of FIG. 2B, the cyclical patterns $24_i$ and $26_i$ both comprise a "closed N" pattern that repeats across the radius of the disk 18 without any spacing between the "N" patterns as compared to FIG. 1B. Also in the embodiment of FIG. 2B, each servo sector 32 has recorded therein both cyclical patterns $24_i$ and $26_i$ so that the servo sample rate corresponds to the number of servo sectors 32. Each servo sector 32 may also comprise additional information, such as a preamble, sync mark, and track address as shown in the conventional servo sector of FIG. 1A.

The time intervals T1 and T2 are detected by control circuitry 34 within the disk drive by processing a read signal 36 emanating from the head 28 as the head 28 passes over the time-based servo patterns $20_A$ and $20_B$. The control circuitry 34 processes the time intervals T1 and T2 to generate a position error signal (PES) representing an offset of the head 28 from a target radial location (e.g., the center of a target servo track). The PES is converted into the control signal 30 (e.g., after appropriate filtering) which is applied to a voice coil motor (VCM) 38. The VCM 38 rotates an actuator arm 40 about a pivot in order to position the head 28 radially over the disk 18. The control circuitry 34 may process the time intervals T1 and T2 in any suitable manner to generate the PES, such as by computing a difference between the time intervals T1 and T2 divided by the sum of the time intervals T1 and T2.

In the embodiments of the present invention, the cyclical patterns (e.g., $24_i$ and $26_i$) overlap at least part of the same servo track so that signal power is not lost when the head 28 is between tracks. This is illustrated in FIG. 2B wherein the head 28 is shown positioned between servo track N and servo track N+1. When tracking servo track N, the control circuitry 34 adjusts timing windows to demodulate the second time-based servo pattern $20_B$. When the head 28 is offset up to a half track from the centerline of servo track N (e.g., between servo track N and servo track N+1), there is still a full signal from the timing marks in the second cyclical pattern $26_i$. When the control circuitry 34 switches the target track to servo track N+1, the control circuitry 34 adjusts the timing windows to demodulate the first time-based servo pattern $20_A$. When the head 28 is offset up to a half track from the centerline of servo track N+1 (e.g., between servo track N and servo track N+1), there is still a full signal from the timing marks in the first cyclical pattern $24_i$.

Thus, in one embodiment, one of the first cyclical patterns (e.g., cyclical pattern $24_i$) overlaps at least part of a first servo track (e.g., servo track N+1), and one of the second cyclical patterns (e.g., cyclical pattern $26_i$) overlaps at least part of the first servo track (e.g., servo track N+1). In one embodiment, the first cyclical pattern (e.g., cyclical pattern $24_i$) overlaps the entire first servo track (e.g., servo track N+1), and the second cyclical pattern (e.g., cyclical pattern $26_i$) overlaps a portion of the first servo track (e.g., servo track N+1). In one embodiment, the control circuitry 34 processes the first set of time-based servo patterns (e.g., time-based servo patterns $20_A$) to generate the control signal 30 used to maintain the head 28 over the first servo track (e.g., servo track N+1), and in one embodiment, the control circuitry 34 processes the second set of time-based servo patterns (e.g., time-based servo patterns $20_B$) to generate the control signal 30 used to maintain the head 28 over a second servo track (e.g., servo track N) adjacent the first servo track (e.g., servo track N+1).

Figure 3:
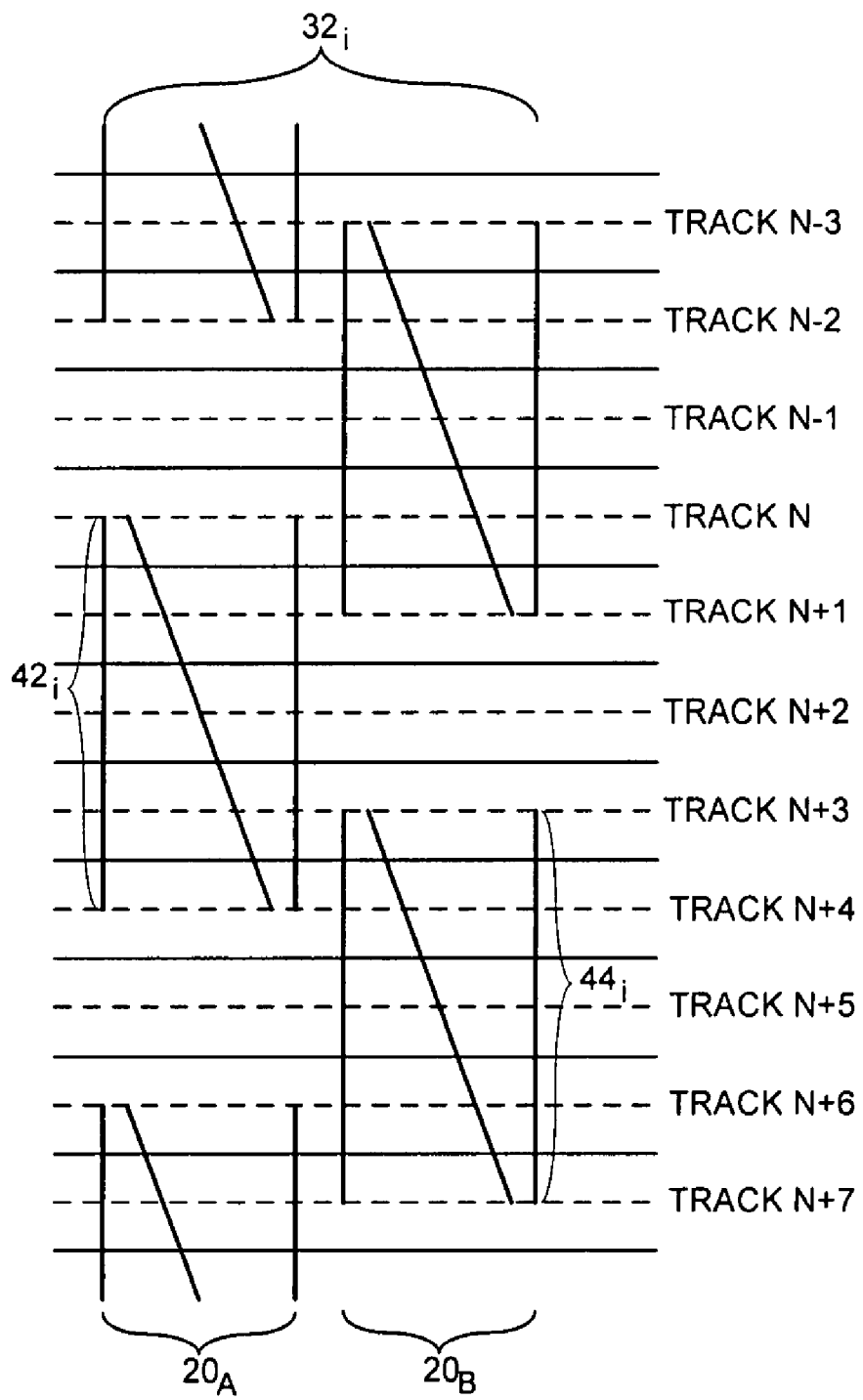
FIG. 3 shows an alternative embodiment of the time-based servo pattern wherein each cycle pattern overlaps multiple servo tracks.

Any suitable time-based servo pattern may be employed in the embodiments of the present invention. FIG. 3 shows an embodiment wherein the time-based servo patterns $20_A$ and $20_B$ comprise cyclical patterns (e.g., $42_i$ and $44_i$) that both form an "open N" pattern (spacing between each "N" pattern). Both cyclical patterns overlap at least one servo track (e.g., cyclical patterns $42_i$ and $44_i$ both overlap servo track N+3). Also in the embodiment of FIG. 3, each cyclical pattern overlaps more than one entire servo track (e.g., cyclical pattern $42_i$ overlaps entire servo tracks N+1, N+2, and N+3), and the control circuitry 34 adjusts the timing windows to demodulate the time-based servo pattern that overlaps the entire track. For example, when the target servo track is N+3, the control circuitry 34 adjusts the timing windows to demodulate time-based servo pattern $20_A$, and when the target servo track is N+4, the control circuitry 34 adjusts the timing windows to demodulate time-based servo pattern $20_B$.

Figure 4:
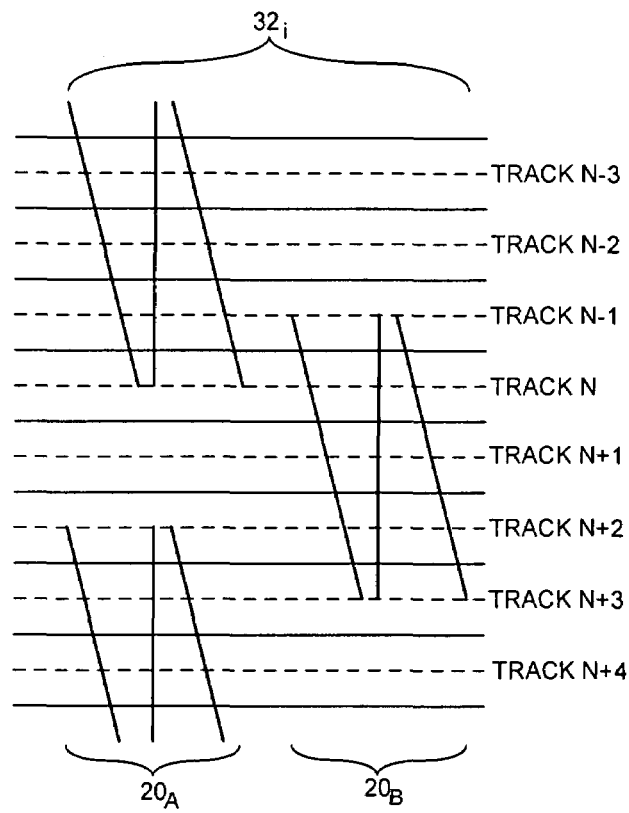
FIGS. 4-8 show alternative time-based servo patterns according to different embodiments of the present invention.
Figure 5:
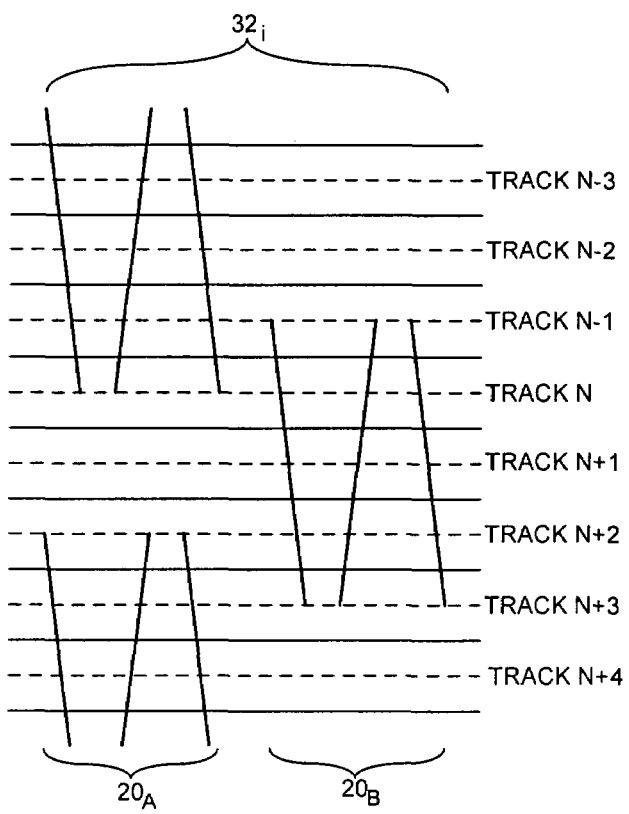
Figure 6:
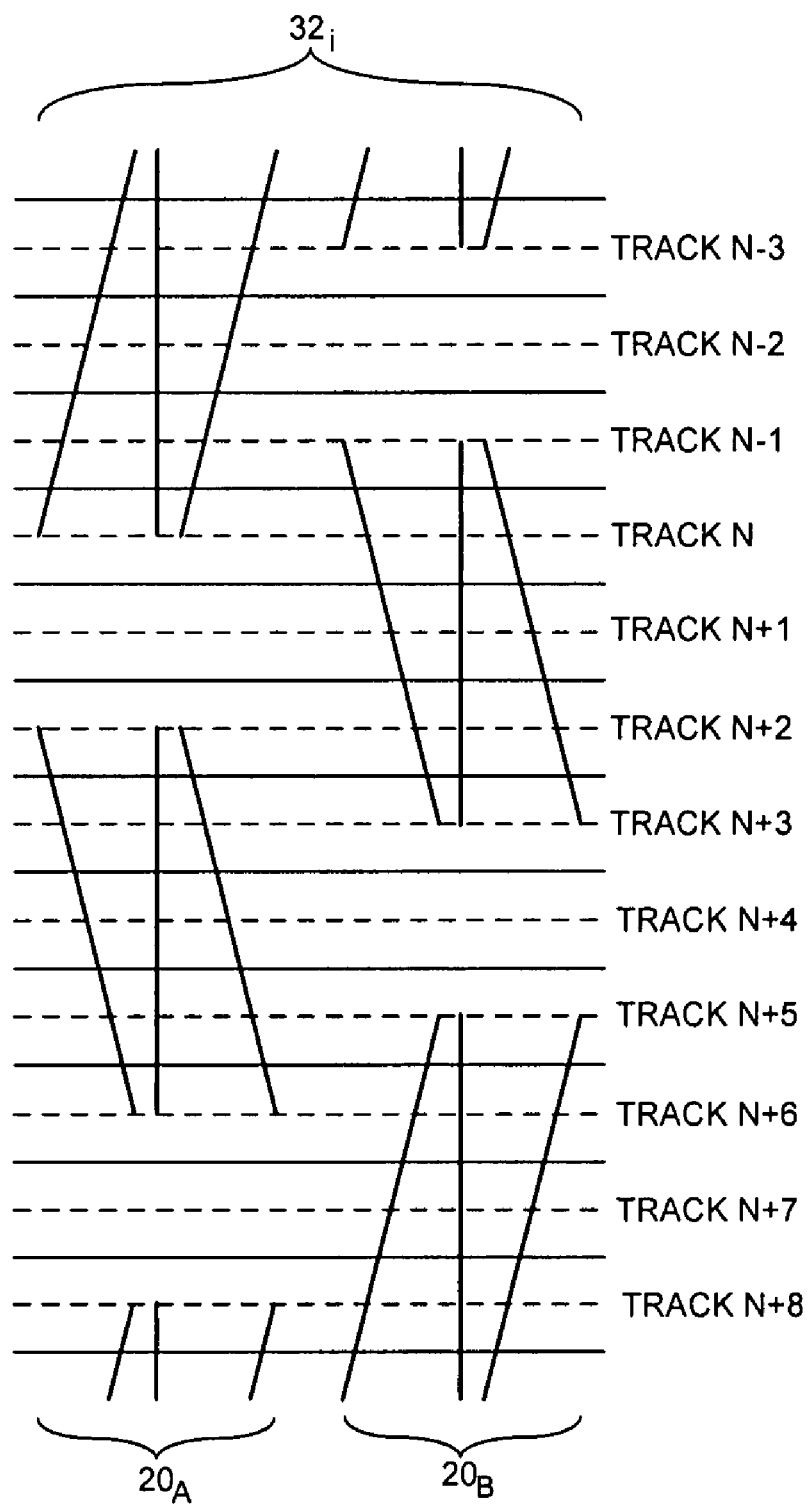
Figure 7:
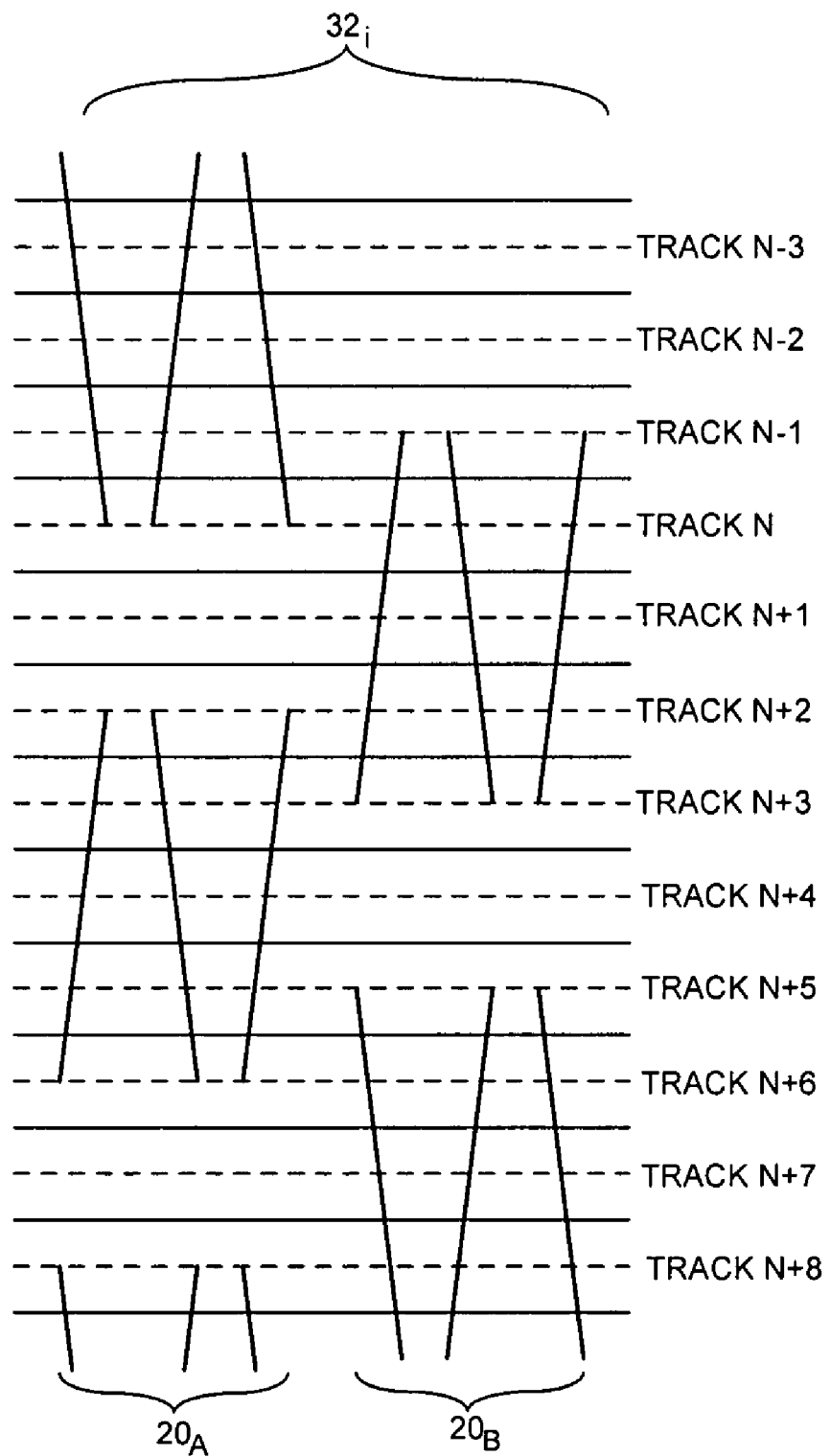
Figure 8:
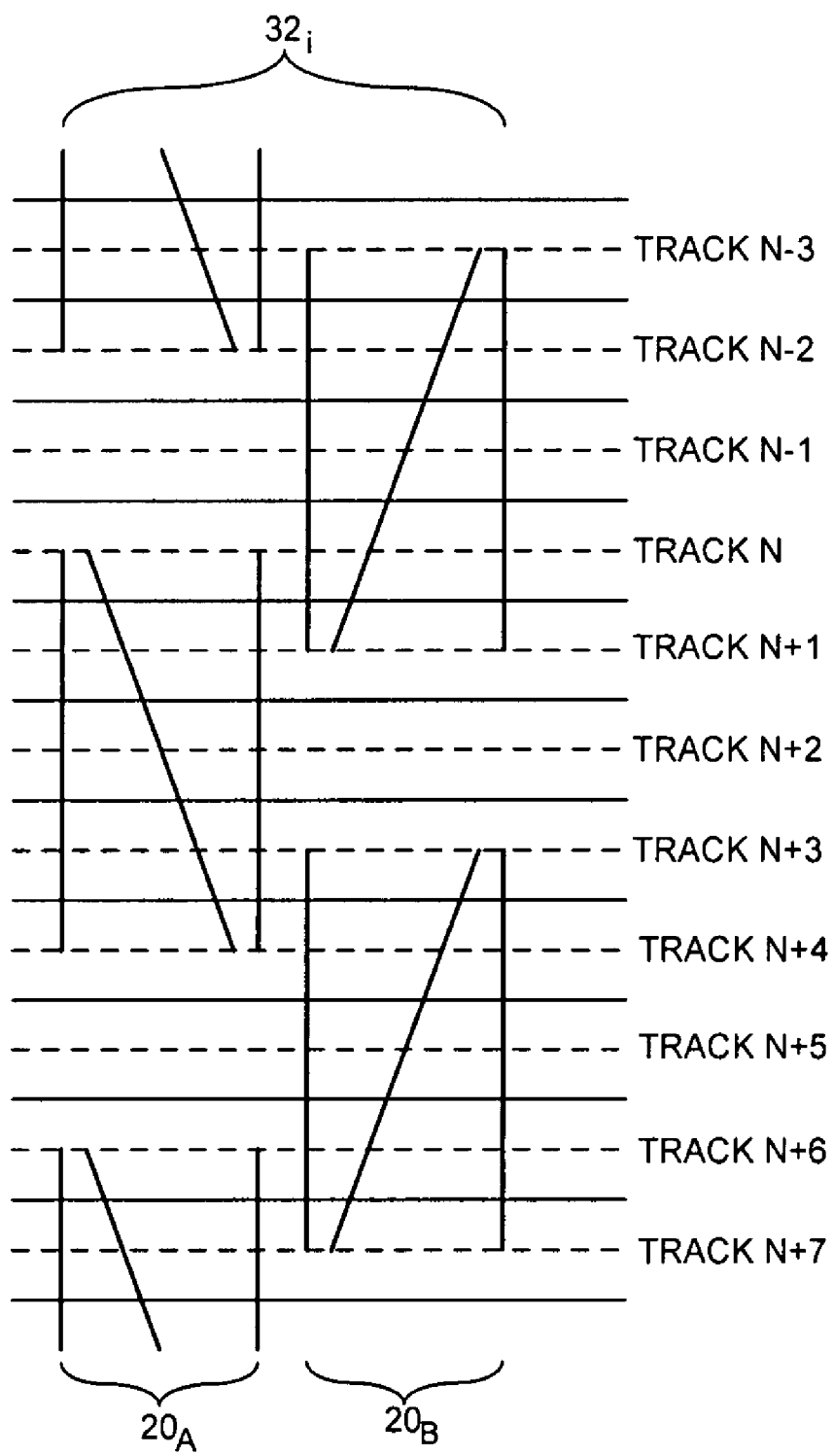

FIG. 4 shows another embodiment for the time-based servo patterns $20_A$ and $20_B$ wherein the timing marks in each cycle pattern form a middle line surrounded by two slanted lines, and FIG. 5 shows yet another embodiment wherein the timing marks in each cycle pattern form three slanted lines. FIG. 6 shows an embodiment wherein the first cyclical pattern in the first time-based servo pattern $20_A$ is different from the second cyclical pattern in the second time-based servo pattern $20_B$. Further example patterns used in alternative embodiments of the present invention are shown in FIGS. 7 and 8 which further demonstrate how any suitable pattern may be employed.

The timing marks that form the cyclical pattern (e.g., the "closed N" pattern of FIG. 2B) may comprise any suitable sequence of magnetic transitions. For example, in one embodiment the area between the timing marks comprise no magnetic transitions and the timing marks comprise one or more magnetic transitions. In an alternative embodiment, the area between the timing marks comprises a high frequency sequence of magnetic transitions (e.g., similar to a preamble) and the timing marks comprise one or more "drop outs" or "missing bits" within the high frequency sequence. Further, any suitable technique may be employed for detecting the timing marks, such as a simple dibit detector, missing bit detector, or a more sophisticated sync mark detector.

In one embodiment, the first set of time-based servo patterns $20_A$ comprises a first timing mark, and the second set of time-based servo patterns $20_B$ comprises a second timing mark, wherein the first timing mark comprises a first timing mark pattern, and the second timing mark comprises a second timing mark pattern different than the first timing mark pattern. For example, in one embodiment the first timing mark pattern comprises a first binary sequence (e.g., 010) and the second timing mark pattern comprises a second binary sequence (e.g., 101). This embodiment may allow the spacing between the time-based servo patterns $20_A$ and $20_B$ to be reduced without misdetecting the timing marks due to jitter in the timing windows.

Figure 9:
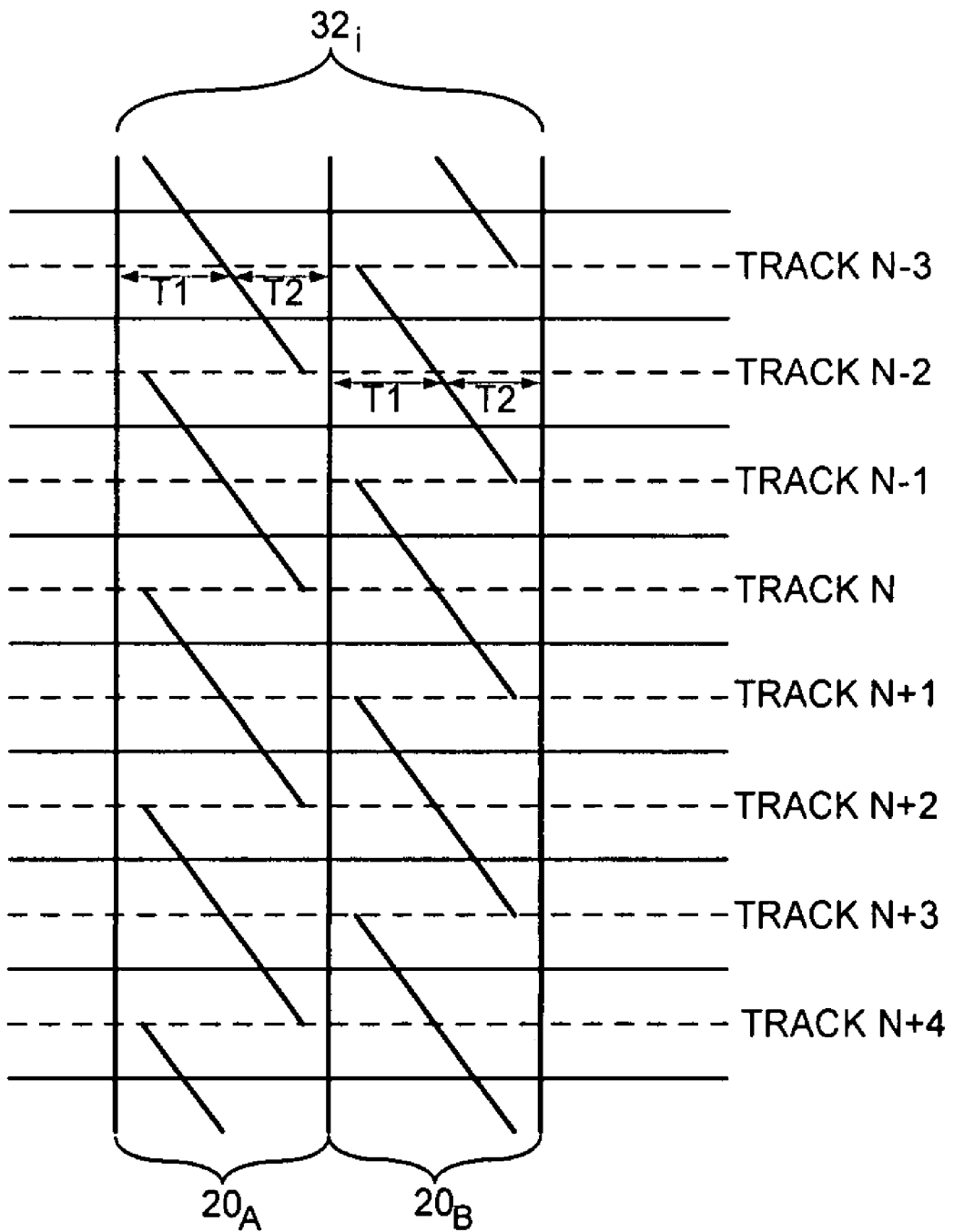
FIG. 9 shows an embodiment of the present invention wherein the first and second set of time-based servo patterns overlap in the circumferential direction such that the first and second set of time-based servo patterns share timing marks.

In one embodiment, the spacing between the time-based servo patterns $20_A$ and $20_B$ is reduced to essentially zero by overlapping the first and second set of time-based servo patterns in the circumferential direction such that the first and second set of time-based servo patterns $20_A$ and $20_B$ share at least one timing mark. This embodiment is illustrated in FIG. 9 wherein the spacing between the time-based servo patterns $20_A$ and $20_B$ of FIG. 2B has been reduced to zero so that they share the center line of timing marks. In one embodiment, at least one of the first and second set of time-based servo patterns comprises first and second timing marks, wherein the first timing mark comprises a first timing mark pattern, and the second timing mark comprises a second timing mark pattern different than the first timing mark pattern. This embodiment helps prevent misdetection due to jitter in the timing windows. For example, this embodiment may help prevent misdetecting the slanted line of timing marks in FIG. 9 as the center line of timing marks by recording the slanted line of timing marks with a different pattern (e.g., a different binary sequence) from the timing marks that define the center line. This modification may be applied to any suitable cyclical pattern that comprises outer vertical lines, such as the pattern shown in FIG. 3 or FIG. 8.

The time-based servo patterns disclosed in the embodiments of the present invention may be employed with any suitable recording media. In one embodiment, the time-based servo patterns may be employed with a discrete track recording (DTR) media wherein the disk comprises at least one groove between each servo track. DTR media may help improve the signal-to-noise ratio (SNR) and thereby allow higher recording densities, but it may preclude the use of conventional servo bursts 14 shown in FIG. 1A for fine head positioning.

The time-based servo patterns disclosed in the embodiments of the present invention may also be written to the disk using any suitable technique, such as with an external servo writer, a media writer, or magnetic stamping techniques. An external servo writer or media writer may comprise a data write head and a separate servo write head, wherein the data write head may be used to write a data portion of the servo sector, such as a preamble, sync mark, and servo data (e.g., track address), and the servo write head may be used to write the time-based servo patterns. Alternatively, an external servo writer or media writer may utilize a single write head for writing both the servo data and time-based servo patterns of the servo sectors.

What is claimed is:

1. A disk drive comprising:
  (a) a disk comprising a first set of time-based servo patterns and a second set of time-based servo patterns that define a plurality of servo tracks, wherein:
    the first set of time-based servo patterns comprises a first cyclical pattern that repeats radially over the disk;
    the second set of time-based servo patterns comprises a second cyclical pattern that repeats radially over the disk;
    each cyclical pattern comprises a plurality of timing marks; and
    one of the first cyclical patterns overlaps at least part of a first servo track, and one of the second cyclical patterns overlaps at least part of the first servo track;
  (b) a head actuated over the disk; and
  (c) control circuitry operable to demodulate at least one of the first and second set of time-based servo patterns to generate a control signal used to position the head over the disk by:
    detecting a first time interval relative to the timing marks;
    detecting a second time interval relative to the timing marks; and
    generating the control signal in response to the first and second time intervals;
  wherein the first cyclical pattern overlaps the entire first servo track, and the second cyclical pattern overlaps a portion of the first servo track.

2. The disk drive as recited in claim 1, wherein the first cyclical pattern is the same as the second cyclical pattern.

3. The disk drive as recited in claim 1, wherein the first cyclical pattern is different from the second cyclical pattern.

4. The disk drive as recited in claim 1, wherein the control circuitry processes the first set of time-based servo patterns to generate the control signal used to maintain the head over the first servo track.

5. The disk drive as recited in claim 4, wherein the control circuitry processes the second set of time-based servo patterns to generate the control signal used to maintain the head over a second servo track adjacent the first servo track.

6. The disk drive as recited in claim 1, wherein:
  the first set of time-based servo patterns comprises a first timing mark;
  the second set of time-based servo patterns comprises a second timing mark;
  the first timing mark comprises a first timing mark pattern; and
  the second timing mark comprises a second timing mark pattern different than the first timing mark pattern.

7. The disk drive as recited in claim 1, wherein the first and second set of time-based servo patterns overlap in the circumferential direction such that the first and second set of time-based servo patterns share at least one timing mark.

8. The disk drive as recited in claim 1, wherein:
  at least one of the first and second set of time-based servo patterns comprises first and second timing marks;
  the first timing mark comprises a first timing mark pattern; and the second timing mark comprises a second timing mark pattern different than the first timing mark pattern.

9. The disk drive as recited in claim 8, wherein the first and second set of time-based servo patterns overlap in the circumferential direction such that the first and second set of time-based servo patterns share at least one of the first timing marks.

10. A method of operating a disk drive, the disk drive comprising a disk having a first set of time-based servo patterns and a second set of time-based servo patterns that define a plurality of servo tracks, wherein:
the first set of time-based servo patterns comprises a first cyclical pattern that repeats radially over the disk;
the second set of time-based servo patterns comprises a second cyclical pattern that repeats radially over the disk;
each cyclical pattern comprises a plurality of timing marks; and
one of the first cyclical patterns overlaps at least part of a first servo track, and one of the second cyclical patterns overlaps at least part of the first servo track;
the disk drive further comprising a head actuated over the disk, the method comprising:
detecting a first time interval relative to the timing marks;
detecting a second time interval relative to the timing marks; and
generating a control signal in response to the first and second time intervals, the control signal for positioning the head over the disk;
wherein the first cyclical pattern overlaps the entire first servo track, and the second cyclical pattern overlaps a portion of the first servo track.

11. The method as recited in claim 10, wherein the first cyclical pattern is the same as the second cyclical pattern.

12. The method as recited in claim 10, wherein the first cyclical pattern is different from the second cyclical pattern.

13. The method as recited in claim 10, wherein the first set of time-based servo patterns are processed to generate the control signal used to maintain the head over the first servo track.

14. The method as recited in claim 13, wherein the second set of time-based servo patterns are processed to generate the control signal used to maintain the head over a second servo track adjacent the first servo track.

15. The method as recited in claim 10, wherein:
the first set of time-based servo patterns comprises a first timing mark;
the second set of time-based servo patterns comprises a second timing mark;
the first timing mark comprises a first timing mark pattern; and
the second timing mark comprises a second timing mark pattern different than the first timing mark pattern.

16. The method as recited in claim 10, wherein the first and second set of time-based servo patterns overlap in the circumferential direction such that the first and second set of time-based servo patterns share at least one timing mark.

17. The method as recited in claim 10, wherein:
at least one of the first and second set of time-based servo patterns comprises first and second timing marks;
the first timing mark comprises a first timing mark pattern; and
the second timing mark comprises a second timing mark pattern different than the first timing mark pattern.

18. The method as recited in claim 17, wherein the first and second set of time-based servo patterns overlap in the circumferential direction such that the first and second set of time-based servo patterns share at least one of the first timing marks.

* * * * *